(12) United States Patent
Matsumoto et al.

(10) Patent No.: US 11,462,243 B1
(45) Date of Patent: Oct. 4, 2022

(54) HEAT-ASSISTED MAGNETIC RECORDING (HAMR) HEAD WITH TAPERED MAIN POLE AND HEAT SINK MATERIAL ADJACENT THE POLE

(71) Applicant: Western Digital Technologies, Inc., San Jose, CA (US)

(72) Inventors: Takuya Matsumoto, San Jose, CA (US); Muhammad Asif Bashir, San Jose, CA (US); Hamid Balamane, Portola Valley, CA (US); Petrus Vanderheijden, Cupertino, CA (US); Barry Cushing Stripe, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/943,995

(22) Filed: Jul. 30, 2020

Related U.S. Application Data

(62) Division of application No. 16/520,250, filed on Jul. 23, 2019, now abandoned.

(51) Int. Cl.
*G11B 11/24* (2006.01)
*G11B 11/105* (2006.01)
(Continued)

(52) U.S. Cl.
CPC .......... *G11B 11/10536* (2013.01); *G11B 5/21* (2013.01); *G11B 11/24* (2013.01); *G11B 2005/0021* (2013.01)

(58) Field of Classification Search
None
See application file for complete search history.

(56) References Cited

U.S. PATENT DOCUMENTS

| 8,259,411 B2 | 9/2012 | Yang et al. |
| 8,619,514 B1 | 12/2013 | Matsumoto |

(Continued)

FOREIGN PATENT DOCUMENTS

| CN | 105304096 A | 2/2016 |
| CN | 105938717 A | 9/2016 |

(Continued)

OTHER PUBLICATIONS

International Search Report and Written Opinion issued in corresponding Internation Patent Application No. PCT/US2020/025407, dated Jul. 17, 2020 (11 pages).

(Continued)

*Primary Examiner* — William J Klimowicz
(74) *Attorney, Agent, or Firm* — Patterson + Sheridan, LLP; Steven H. VerSteeg

(57) ABSTRACT

A heat-assisted magnetic recording (HAMR) head for recording data in data tracks of a HAMR disk has a gas-bearing slider that supports a near-field transducer (NFT) and a main magnetic pole formed of two layers. The first main pole layer has a cross-track width at the slider's gas-bearing surface (GBS) that tapers down in the direction towards the NFT where the optical spot is formed. The second main pole layer is located away from the NFT and has a substantially wider cross-track width than the first main pole layer so as to provide sufficient magnetic field for writing. Layers of heat sink material are located on the sloped cross-track sides of the tapered first main pole layer to reduce the temperature and thus the likelihood of oxidation of the main pole layers.

22 Claims, 11 Drawing Sheets

(51) Int. Cl.
  *G11B 5/21* (2006.01)
  *G11B 5/00* (2006.01)

(56) References Cited

U.S. PATENT DOCUMENTS

| | | | |
|---|---|---|---|
| 8,619,516 | B1 | 12/2013 | Matsumoto |
| 8,917,480 | B2 | 12/2014 | Liu et al. |
| 9,036,307 | B1 | 5/2015 | Hoshiya et al. |
| 9,047,908 | B2 | 6/2015 | Rawat et al. |
| 9,053,715 | B1 | 6/2015 | Wang et al. |
| 9,142,233 | B1 * | 9/2015 | Gibbons ................. G11B 5/314 |
| 9,449,625 | B1 | 9/2016 | Vossough et al. |
| 9,530,445 | B1 | 12/2016 | Grobis et al. |
| 9,761,253 | B1 * | 9/2017 | Sasaki ................. G11B 5/4866 |
| 9,773,517 | B2 | 9/2017 | Gao et al. |
| 9,953,675 | B2 | 4/2018 | Ho et al. |
| 10,115,428 | B1 | 10/2018 | Bertero et al. |
| 10,192,577 | B1 | 1/2019 | McGeehin et al. |
| 10,297,277 | B1 | 5/2019 | Sasaki et al. |
| 10,410,658 | B1 | 9/2019 | Liu et al. |
| 10,438,617 | B2 | 10/2019 | Gorantla et al. |
| 10,714,137 | B1 * | 7/2020 | Krishnamurthy ..... G11B 5/3116 |
| 10,748,572 | B1 * | 8/2020 | Yang ................. G11B 5/012 |
| 10,770,098 | B1 * | 9/2020 | Peng ................. G11B 5/314 |
| 2003/0128633 | A1 | 7/2003 | Batra et al. |
| 2004/0061988 | A1 | 4/2004 | Matono et al. |
| 2007/0153417 | A1 | 7/2007 | Suh et al. |
| 2010/0033865 | A1 | 2/2010 | Hashimoto et al. |
| 2011/0170381 | A1 | 7/2011 | Matsumoto |
| 2011/0222188 | A1 | 9/2011 | Etoh et al. |
| 2013/0258825 | A1 | 10/2013 | Seigler et al. |
| 2013/0279315 | A1 | 10/2013 | Zhao et al. |
| 2013/0286508 | A1 * | 10/2013 | Takano ................. G11B 5/314 360/125.14 |
| 2014/0104724 | A1 * | 4/2014 | Shiroishi ............. G11B 5/7325 360/75 |
| 2014/0177103 | A1 * | 6/2014 | Bai ........................ G11B 5/315 360/236.4 |
| 2015/0092525 | A1 | 4/2015 | Araki et al. |
| 2015/0103439 | A1 * | 4/2015 | Yin ..................... G11B 5/1278 360/122 |
| 2017/0221511 | A1 | 8/2017 | Dai et al. |
| 2018/0158473 | A1 | 6/2018 | Gorantla et al. |
| 2018/0330748 | A1 * | 11/2018 | Liu ..................... G11B 5/3143 |
| 2019/0066725 | A1 | 2/2019 | Rajauria et al. |
| 2019/0198053 | A1 | 6/2019 | Krichevsky et al. |
| 2019/0259413 | A1 | 8/2019 | Le et al. |

FOREIGN PATENT DOCUMENTS

| | | |
|---|---|---|
| CN | 105989855 A | 10/2016 |
| KR | 100682954 B1 | 2/2007 |
| WO | 03060882 A1 | 7/2003 |

OTHER PUBLICATIONS

Barry Stipe et al., "Enablers for Heat-Assisted Magnetic Recording Head", Powerpoint presentation; Magnetics and Optics Research International Symposium, Queens College of CUNY, New York, USA (slides 10, 11, 15).

International Preliminary Report on Patentability issued in corresponding International Patent Application No. PCT/US2020/025407, dated Feb. 3, 2022, 8 pages.

Chinese Office Action dated Aug. 18, 2022 for Application No. 202080006732.5.

\* cited by examiner

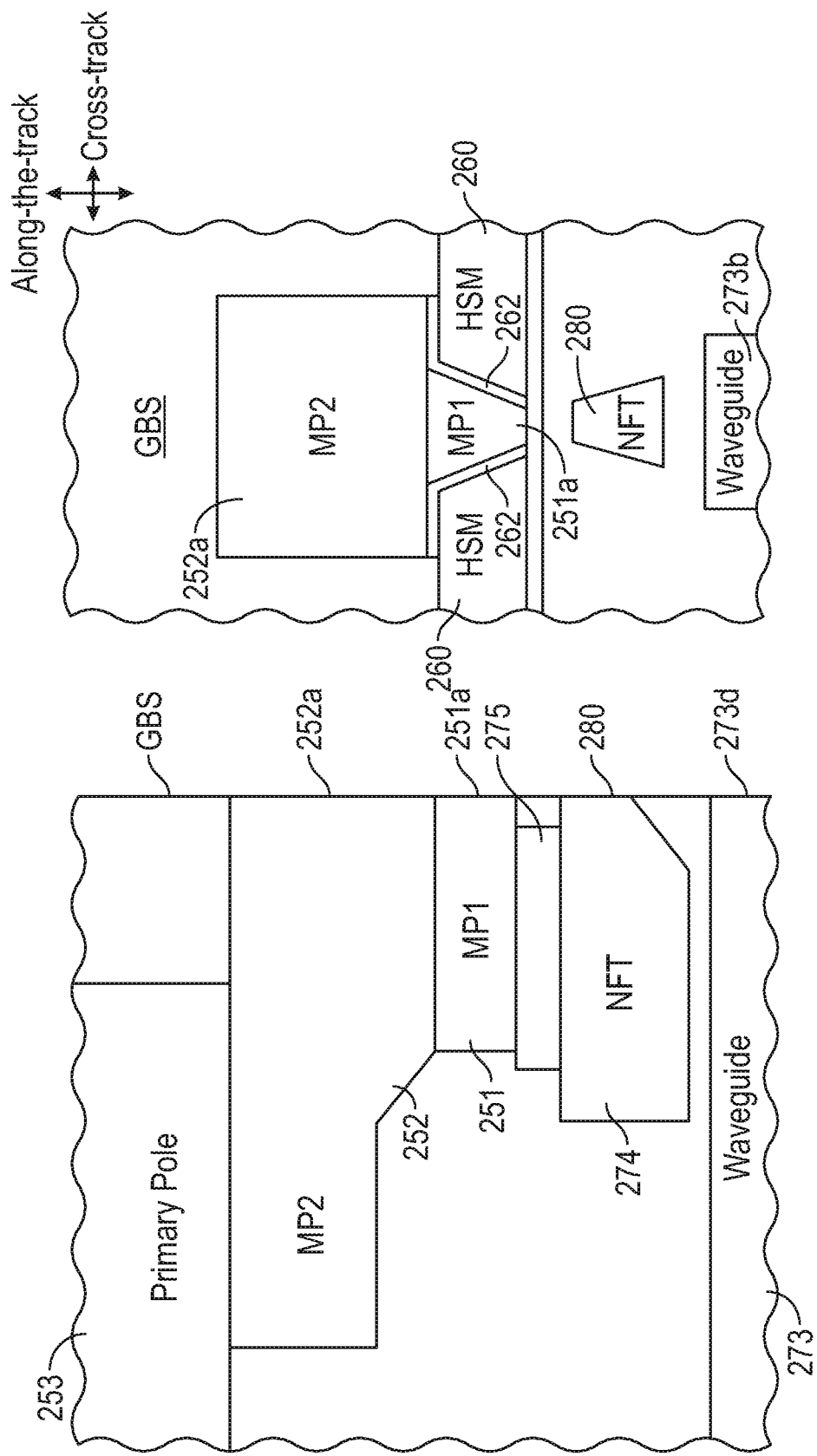

HEAT-ASSISTED MAGNETIC RECORDING (HAMR) HEAD WITH TAPERED MAIN POLE AND HEAT SINK MATERIAL ADJACENT THE POLE

CROSS-REFERENCE TO RELATED APPLICATIONS

This application is a divisional of co-pending U.S. patent application Ser. No. 16/520,250, filed Jul. 23, 2019, herein incorporated by reference.

BACKGROUND OF THE DISCLOSURE

Field of the Disclosure

This invention relates generally to a heat-assisted magnetic recording (HAMR) disk drive, in which data are written while the magnetic recording layer on the disk is at an elevated temperature, and more specifically to an improved HAMR head.

Description of the Related Art

In conventional magnetic recording, thermal instabilities of the stored magnetization in the recording media can cause loss of recorded data. To avoid this, media with high magneto-crystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is heat-assisted magnetic recording (HAMR), wherein high-$K_u$ magnetic recording material is heated locally during writing by the main magnetic pole to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed HAM R systems, the magnetic recording material is heated to near or above its Curie temperature. The recorded data is then read back at ambient temperature by a conventional magnetoresistive read head. HAMR disk drives have been proposed for both conventional continuous media, wherein the magnetic recording material is a continuous layer on the disk, and for bit-patterned media (BPM), wherein the magnetic recording material is patterned into discrete data islands or "bits".

One type of proposed HAMR disk drive uses a laser source and an optical waveguide coupled to a near-field transducer (NFT) for heating the recording material on the disk. A "near-field" transducer refers to "near-field optics", wherein the passage of light is through an element with sub-wavelength features and the light is coupled to a second element, such as a substrate like a magnetic recording medium, located a sub-wavelength distance from the first element. The NFT is typically located at the gas-bearing surface (GBS) of the gas-bearing slider that also supports the read/write head and rides or "files" above the disk surface.

A NFT with a generally triangular output end is described in US published applications 20110096639 and 20110170381, both assigned to the same assignee as this application. In this NFT an evanescent wave generated at a surface of the waveguide couples to surface plasmons excited on the surface of the NFT 74 and a strong optical near-field is generated at the apex of the triangular output end.

SUMMARY OF THE DISCLOSURE

In conventional HAMR heads the main magnetic pole for generating the magnetic field for writing has a relatively wide cross-track width to apply a high magnetic field at the optical spot generated by the NFT. However, the wide main pole increases the rise time of the magnetic field during writing and thus decreases the data rate. Thus it is desirable to reduce the width of the main pole but without substantially decreasing the magnetic field applied at the optical spot. Additionally, the main pole is easily oxidized at the GBS due to temperature rise and wear of the protective overcoat on the head. Thus it is desirable to minimize oxidation of the main pole.

In embodiments of this invention, the main pole is formed of two layers, with the first layer having a width that tapers down in the direction towards the NFT where the optical spot is formed, and the second layer located away from the NFT having a substantially wider width than the first layer so as to provide sufficient magnetic field. Layers of heat sink material are located on the sloped cross-track sides of the tapered main pole first layer to reduce the temperature and thus the likelihood of oxidation.

For a fuller understanding of the nature and advantages of the present invention, reference should be made to the following detailed description taken together with the accompanying figures.

BRIEF DESCRIPTION OF THE DRAWING

FIG. 4A is a side sectional view of the HAMR head according to an embodiment of the invention and shows the layers of material making up the primary pole, the first and second main poles (MP1 and MP2), the NFT and the waveguide.

FIG. 4B is a view of a portion of the GBS of the HAMR head according to an embodiment of the invention showing the relative orientations of the waveguide end, the NFT output tip, the MP1 end and the MP2 end.

DETAILED DESCRIPTION

Figure 1:
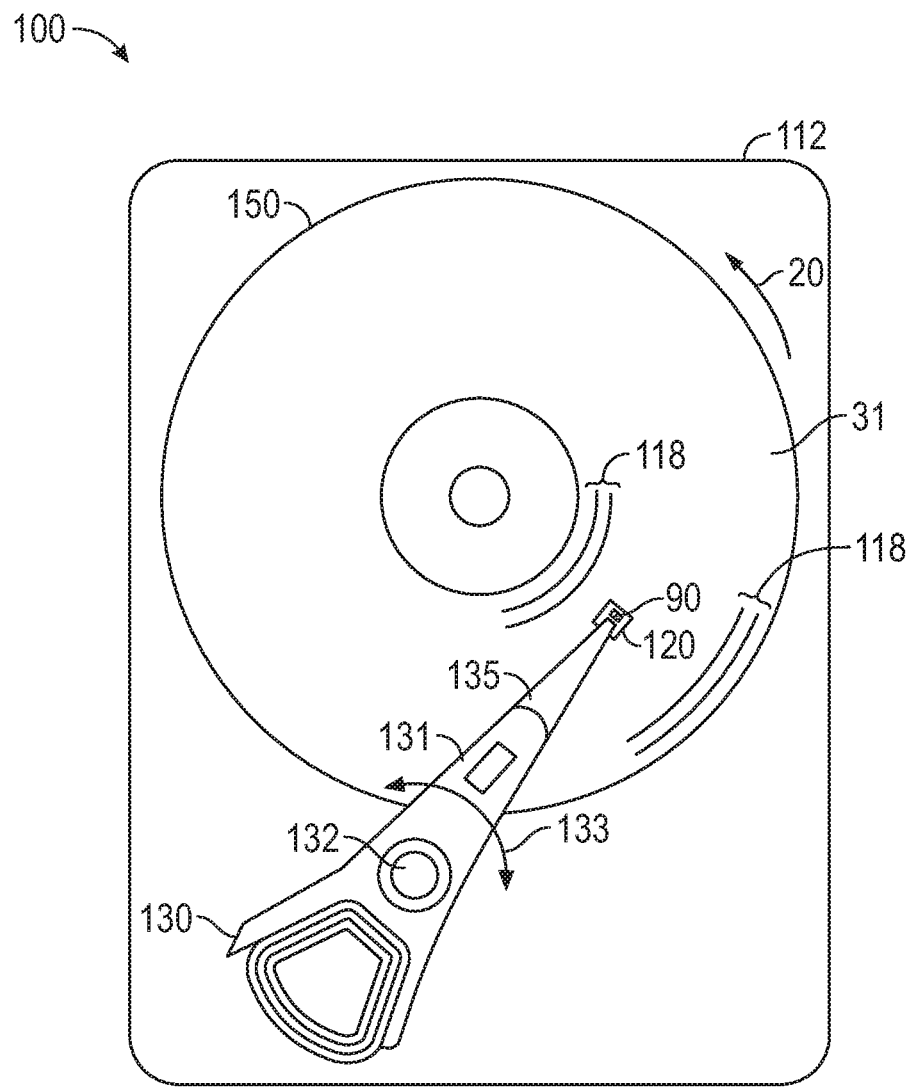
FIG. 1 is a top view of a heat-assisted magnetic recording (HAMR) disk drive according to an embodiment of the invention.

FIG. 1 is a top view of a heat-assisted recording (HAMR) disk drive 100 according to an embodiment of the invention. In FIG. 1, the HAMR disk drive 100 is depicted with a disk 150 with magnetic recording layer 31 of conventional continuous magnetic recording material arranged in radially-spaced circular tracks 118. Only a few representative tracks 118 near the inner and outer diameters of disk 150 are shown. However, instead of a conventional continuous magnetic recording layer, the recording layer may be a bit-patterned-media (BPM) layer with discrete data islands.

The drive 100 has a housing or base 112 that supports an actuator 130 and a drive motor for rotating the magnetic recording disk 150. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an gas-bearing slider 120, attached to the other end of suspension 135. The suspension 135 permits the slider 120 to be maintained very close to the surface of disk 150 and enables it to "pitch" and "roll" on the bearing of gas (typically air or helium) generated by the disk 150 as it rotates in the direction of arrow 20. The slider 120 supports the HAMR head (not shown), which includes a magnetoresistive read head, an inductive write head, the near-field transducer (NFT) and optical waveguide. A semiconductor laser 90 with a wavelength of 780 to 980 nm may used as the HAMR light source and is depicted as being supported on the top of slider 120. Alternatively the laser may be located on suspension 135 and coupled to slider 120 by an optical channel. As the disk 150 rotates in the direction of arrow 20, the movement of actuator 130 allows the HAMR head on the slider 120 to access different data tracks 118 on disk 150. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
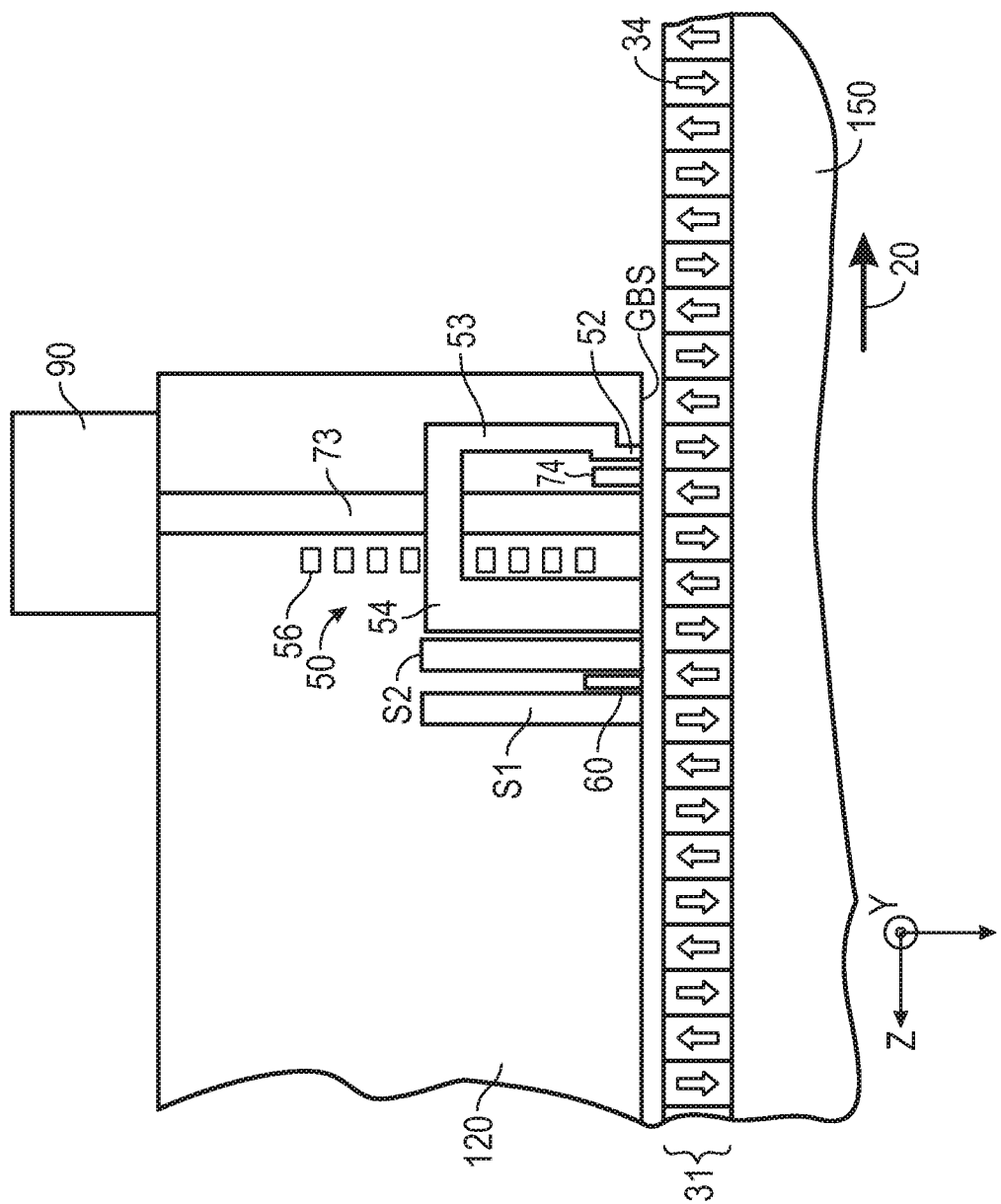
FIG. 2 depicts a sectional view, not drawn to scale because of the difficulty in showing the very small features, of a gas-bearing slider for use in HAMR disk drive and a portion of a HAMR disk according to the prior art.

In the following drawings, the X-axis denotes an axis perpendicular to the gas-bearing surface (GBS) of the slider, the Y-axis denotes a track width or cross-track axis, and the Z-axis denotes an along-the-track axis. FIG. 2 is a schematic cross-sectional view illustrating a configuration example of a HAMR head according to the prior art. In FIG. 2, the disk 150 is depicted with the recording layer 31 being a conventional continuous magnetic recording layer of magnetizable material with magnetized regions or "bits" 34. The gas-bearing slider 120 is supported by suspension 135 and has a GBS that faces the disk 150 and supports the magnetic write head 50, read head 60, and magnetically permeable read head shields S1 and S2. A recording magnetic field is generated by the write head 50 made up of a coil 56, a primary magnetic pole 53 for transmitting flux generated by the coil 56, a main pole 52 connected to the primary pole, and a return magnetic pole 54. A magnetic field generated by the coil 56 is transmitted through the primary pole 53 to the main pole 52 arranged in a vicinity of an optical near-field transducer (NFT) 74. FIG. 2 illustrates the write head 50 with a well-known "pancake" coil 56, wherein the coil segments lie in substantially the same plane. However, alternatively the coil may be a well-known "helical" coil wherein the coil is wrapped around the primary magnetic pole 53. At the moment of recording, the recording layer 31 of disk 150 is heated by an optical near-field generated by the NFT 74 and, at the same time, a region or "bit" 34 is magnetized and thus written onto the recording layer 31 by applying a recording magnetic field generated by the main pole 52.

A semiconductor laser 90 is mounted to the top surface of slider 120. An optical waveguide 73 for guiding light from laser 90 to the NFT 74 is formed inside the slider 120. Materials that ensure a refractive index of the waveguide 73 core material to be greater than a refractive index of the cladding material may be used for the waveguide 73. For example, $Al_2O_3$ may be used as the cladding material and $TiO_2$, $Ta_2O_5$ and $SiO_xN_y$ as the core material. Alternatively, $SiO_2$ may be used as the cladding material and $Ta_2O_5$, $TiO_2$, $SiO_xN_y$, or Ge-doped $SiO_2$ as the core material. The waveguide 73 that delivers light to NFT 74 is preferably a single-mode waveguide.

Figure 3A:
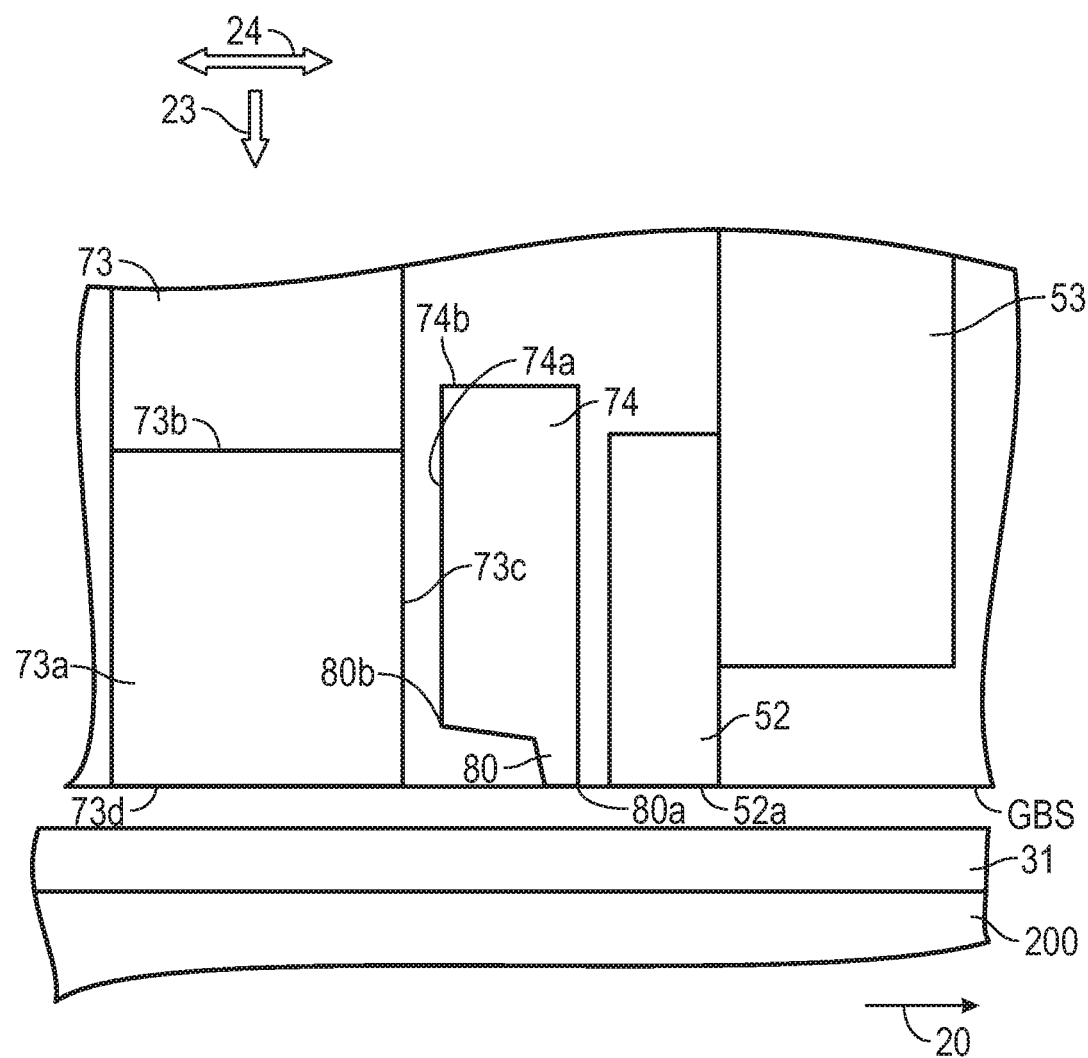
FIG. 3A is a side sectional view of the layers of material making up the main pole and primary pole, the near-field transducer (NFT) and the waveguide according to the prior art and shown in relation to the recording layer on the disk.
Figure 3B:
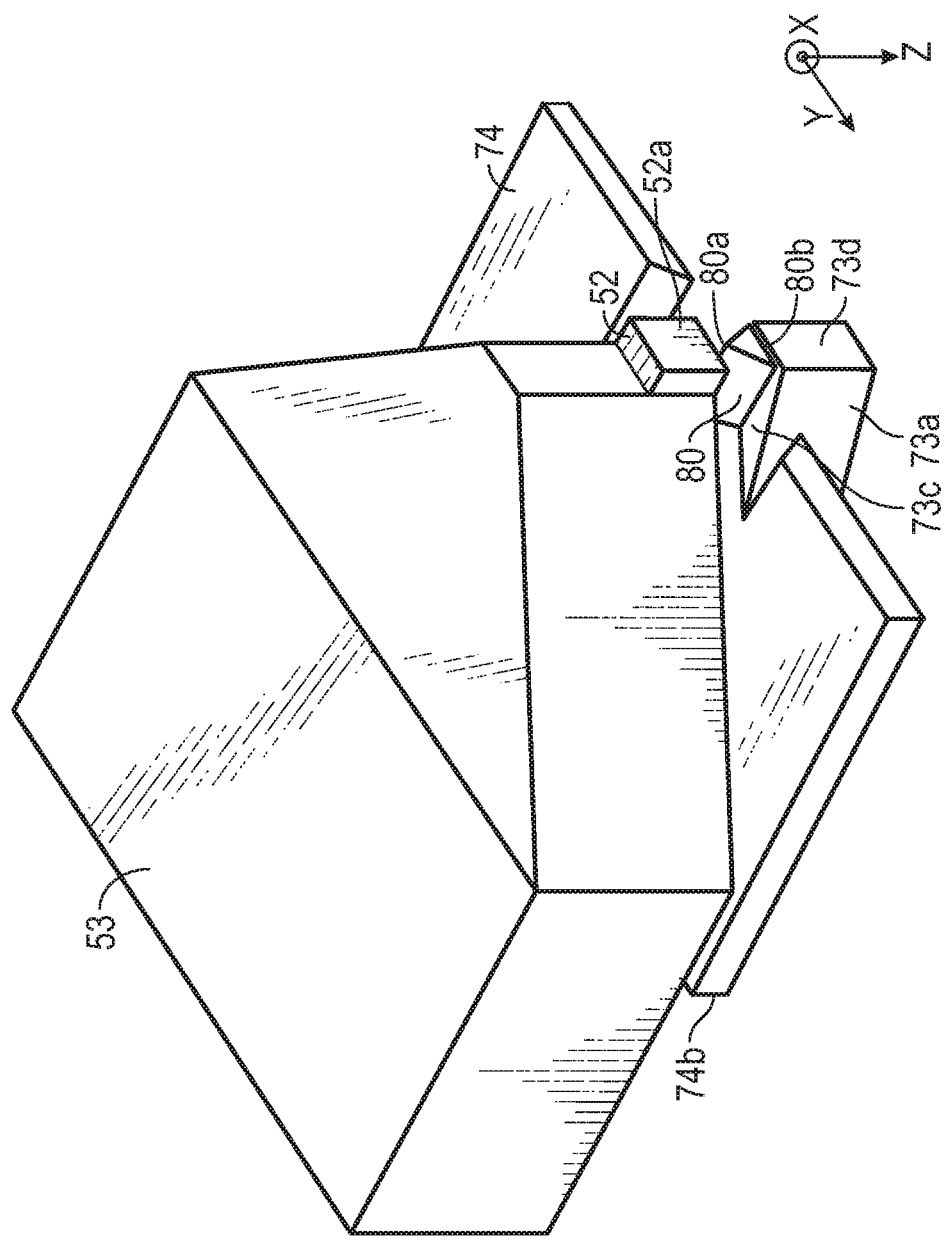
FIG. 3B is a perspective view of the layers of material making up the main pole and primary pole, the NFT and the waveguide according to the prior art.
Figure 3C:
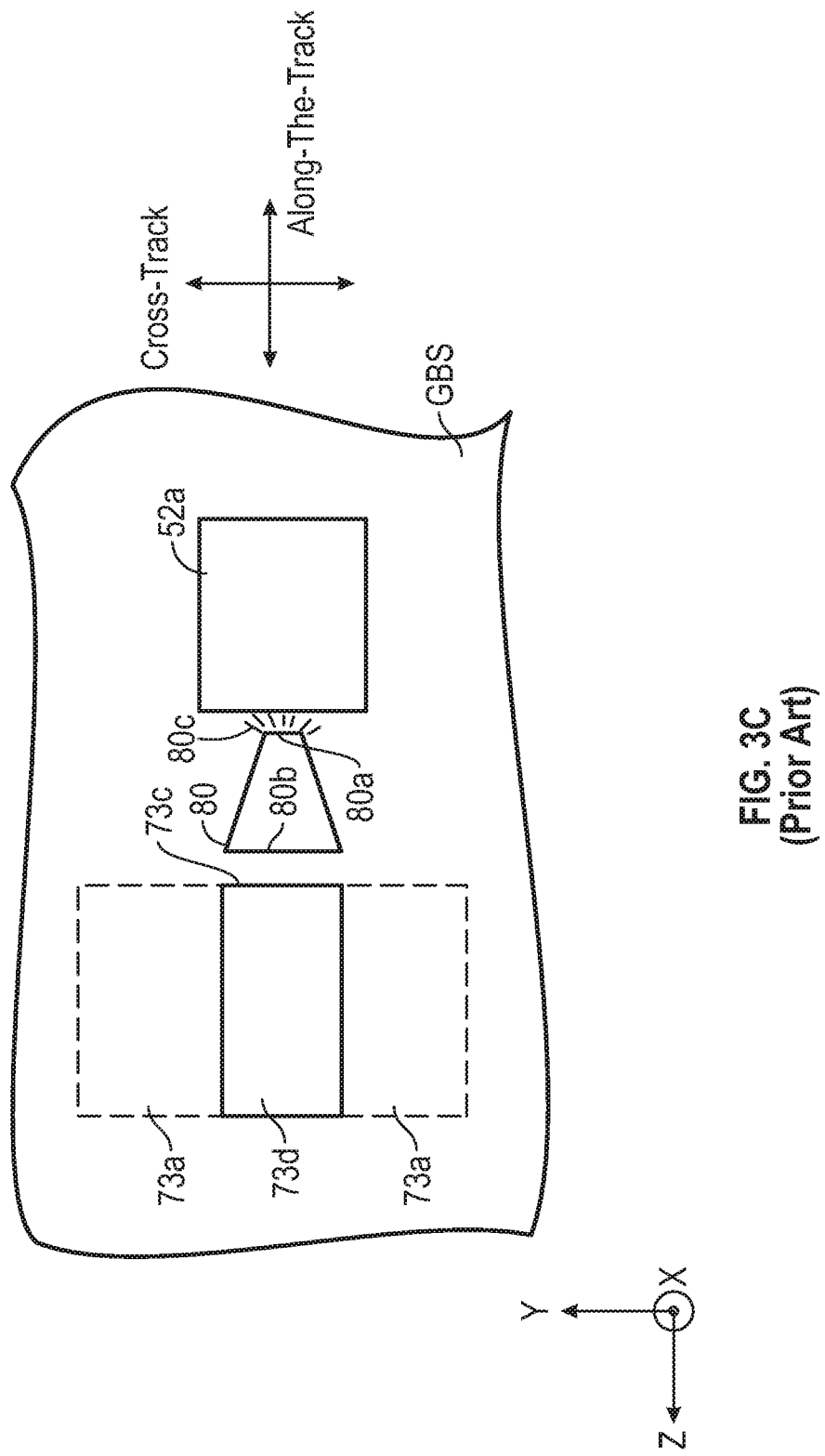
FIG. 3C is a view of a portion of the slider gas-bearing surface (GBS) showing the relative orientations of the waveguide, the NFT output tip and the main pole tip.

FIG. 3A is a side sectional view of a prior art HAMR head and shows the layers of material making up the main pole 52, the NFT 74 and the waveguide 73 and shown in relation to disk 150 with recording layer 31. The main pole 52 is typically a layer of high-moment material like FeCo and has a pole tip 52a at the GBS. The waveguide 73 is a layer of core material generally parallel to the main pole 52 layer with a length orthogonal to the GBS and may have a tapered region 73a extending from the GBS to a region 73b recessed from the GBS. The waveguide 73 has a generally planar surface 73c that faces and is parallel to NFT 74 layer and an end 73d at the GBS. The NFT 74 layer is a conductive low-loss metal (preferably Au, but also Ag, Al or Cu), is generally parallel to waveguide 73 layer and main pole 52 layer, and is located between and spaced from the waveguide 73 layer and the main pole 52 layer. The NFT 74 layer has a surface 74a that faces and is spaced from waveguide surface 73c. The NFT 74 layer has an output tip 80 at the GBS. When light is introduced into the waveguide 73, an evanescent wave is generated at the surface 73c and couples to a surface plasmon excited on the surface 74a of NFT 74. Arrow 23 shows the direction of propagation of light in waveguide 73 and arrow 24 shows the direction of polarization of the light. The surface plasmon propagates to the output tip 80. The output tip 80 has an apex 80a that faces the main pole tip 52a and a back edge 80b that faces the waveguide surface 73c. At the apex 80a an optical near-field spot is generated in the space at the GBS between the output tip apex 80a and the main pole tip 52a. The main pole tip 52a applies a magnetic field at the optical spot. FIG. 3B is a perspective view of a prior art HAMR head and shows the primary pole 53, the main pole 52, the NFT 74 and the waveguide 73. FIG. 3C is a view of a portion of the GBS showing the relative orientations of the waveguide end 73*d*, the NFT output tip 80 and the main pole tip 52*a*. The output tip 80 has a generally triangular shape at the GBS with an apex 80*a* that faces the main pole tip 52*a* and a back edge 80*b* that faces the waveguide surface 73*c* and is wider than apex 80*a* in the cross-track direction. Thus the output tip 80 has a back edge 80*b* at the GBS perpendicular to a polarization direction of incident light transmitted through the waveguide (arrow 24 in FIG. 3A) that gradually becomes smaller toward the apex 80*a* where an optical near-field is generated. The small lines 80*c* represent the optical spot generated at the output tip apex 80*a*. FIGS. 3B-3C show the tapered region 73*a* of waveguide 73 and how it tapers from a width at a region recessed from the GBS down to a smaller width that is generally at least the same cross-track width as the back edge 80*b* of NFT output tip 80.

The main pole 52*a* (FIG. 3C) has a relatively wide cross-track width to apply a high magnetic field at the optical spot 80C. However, the wide main pole increases the rise time of the magnetic field during writing and thus decreases the data rate. Thus it is desirable to reduce the width of the main pole but without substantially decreasing the magnetic field applied at the optical spot. Additionally, the main pole is easily oxidized at the GBS due to temperature rise and wear of the protective overcoat on the head. Thus it is desirable to minimize oxidation of the main pole.

In embodiments of this invention, the main pole is formed of two layers, with the first layer having a width that tapers down in the direction towards the NFT where the optical spot is formed, and the second layer located away from the NFT having a substantially wider width than the first layer so as to provide sufficient magnetic field. Layers of heat sink material are located on the sloped cross-track sides of the tapered main pole first layer to reduce the temperature and thus the likelihood of oxidation. The heat sink material may extend slightly beyond the main pole at the GBS and thus help prevent the slider overcoat on the main pole from being worn away, which could also result in oxidation of the main pole.

FIG. 4A is a side sectional view of the HAMR head according to an embodiment of the invention and shows the layers of material making up the primary magnetic pole 253, the first and second main magnetic poles 251,252 (MP1 and MP2), the NFT 274 and the waveguide 273. FIG. 4B is a view of a portion of the GBS of the HAMR head according to an embodiment of the invention showing the relative orientations of the waveguide end 273*d*, the NFT output tip 280, the MP1 end 251*a* and the MP2 end 252*a*.

The MP1 layer is in in contact with the MP2 layer and has a generally trapezoidal shape that tapers in the along-the-track direction from the MP2 layer toward the NFT. The taper angle may be up to about 60 degrees. As shown in FIG. 4B, the MP1 end 251*a* has a tapered or generally trapezoidal shape with its narrow portion facing and aligned in the along-the-track direction with the NFT tip 280. The MP2 end 252*a* is wider in the cross-track direction than the wider portion of the MP1 end 251*a*. For example, MP2 may have a cross-track width of about 200 nm and the wider portion of MP1 may have a cross-track width of about 50 nm. The width of MP1 can be smaller than 50 nm to reduce the rise time of the write current. Alternatively, it can be wider than 50 nm, as long as it is narrower than the width of MP2, to increase the alignment tolerance between the NFT and MP1. MP1 may have an along-the-track length between about 50-500 nm. MP1 and MP2 may be formed of the same or different ferromagnetic materials like NiFe, CoFe and CoFeNi. For example, MP2 may be formed of NiFe and MP1 of a higher magnetic moment material like CoFeNi.

Heat sink material (HSM) 260 is located on the sloped sides on the MP1 end 251*a*. The HSM is a material with a thermal conductivity greater than that of the MP1 material. These materials include Au, Cu, Ag, Al, Mg, In, Ir, Rh, Ru, Cr, Be, Mo, Co, W, Ti, Ni and Pt, or alloys including two or more of these elements, such as AuAg, AuCu, Au Rh, AuNi, Au Pt, WCu, MoCu and CuMoW.

Figure 5B:
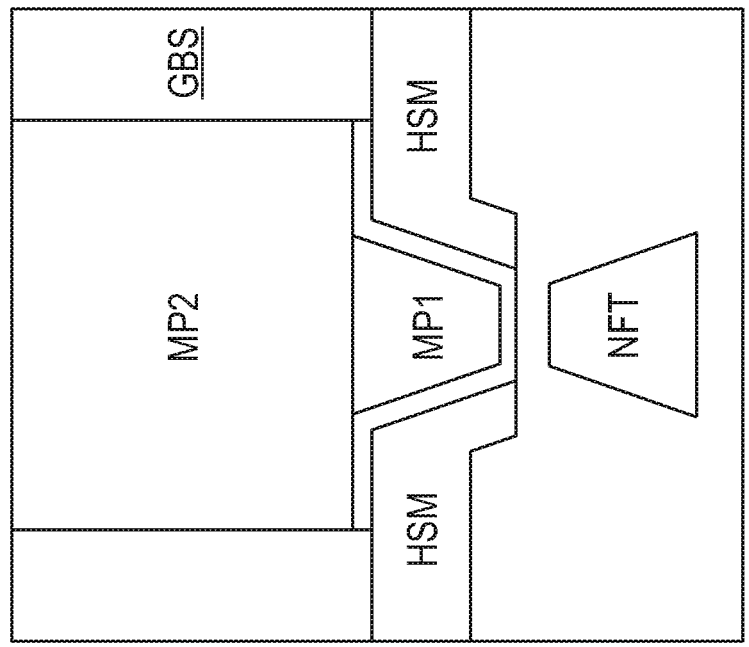
FIG. 5B is a view of a portion of the slider GBS showing the HSM recessed in the along-the-track direction away from the region between the MP1 end and the NFT output tip.
Figure 5A:
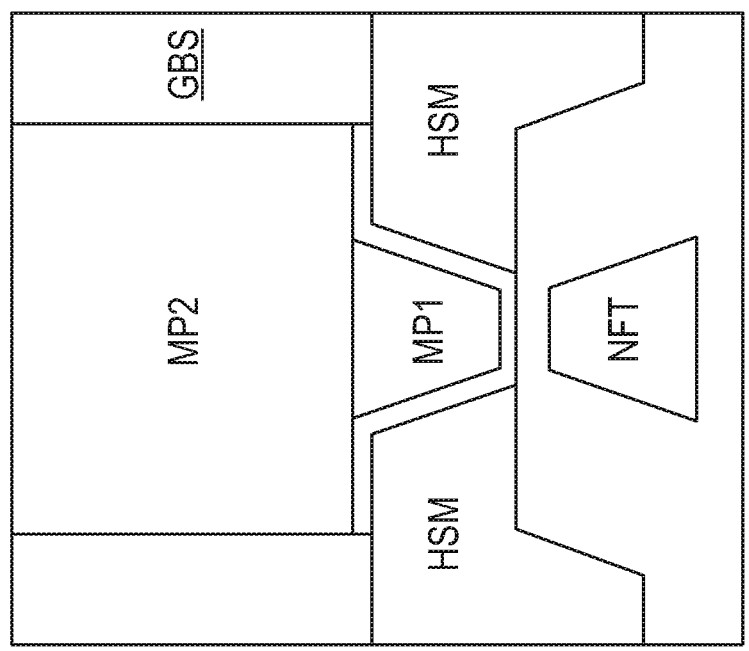
FIG. 5A is a view of a portion of the slider GBS showing the heat-sink material (HSM) extending in the along-the-track direction beyond the region between the MP1 end and the NFT output tip.

If the HSM includes an element that may diffuse into the magnetic material of MP1, like Au or Cu, then a diffusion layer 262 is located between MP1 and the HSM. The material of diffusion layer 262 may be Rh, Ru, In, Co, W, Rh oxide, Ru oxide, Indium oxide, or TiN, with a thickness preferably in the range of 5-10 nm. The cross-track width of the HSM is at least as wide as the cross-track width of MP2 and preferably wider, as shown in FIG. 4B. If the HSM is selected from a material that is not likely to diffuse into the MP1, like Ru or Rh, then the diffusion layer 262 is not required. The temperature of MP1 may be reduced further by extending the HSM in the along-the-track direction beyond the MP1 end 251*a*, as shown in FIG. 5A. Alternatively, if less temperature reduction is required the HSM may be recessed in the along-the-track direction away from the MP1 end 251*a*, as shown in FIG. 5B. Computer modeling has shown that the use of HSM on both sloped sides of the tapered MP1 end 251*a* can result in a 4-8% reduction in the temperature of the NFT and a 9-15% reduction in the temperature of MP1.

FIG. 4A also shows an optional electrically conductive thermal shunt layer 275 between and in contact with MP1 and the NFT 274. The thermal shunt layer 275 is described in U.S. Pat. No. 8,619,516 B1, which is assigned to the same assignee as this application, and allows heat flow from NFT 274 to HSM 260.

Figure 5C:
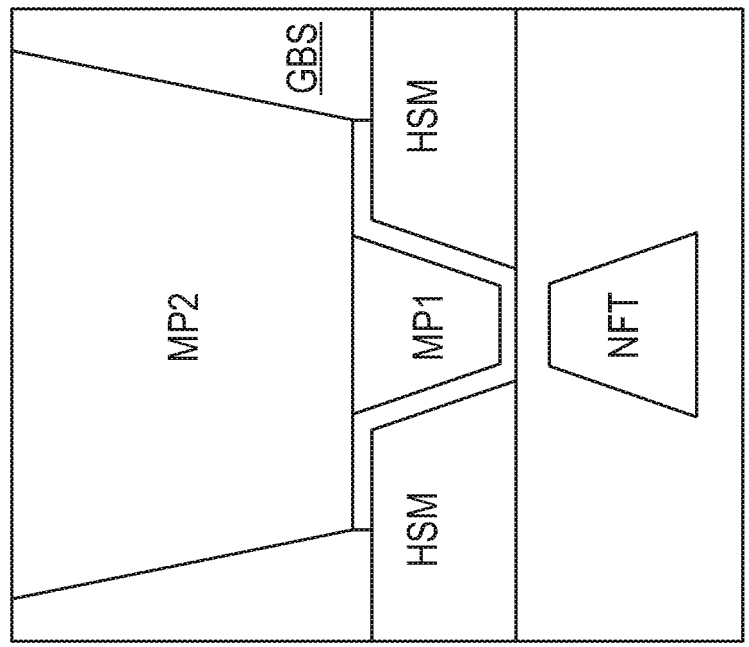
FIG. 5C is a view of a portion of the GBS of the HAMR head according to an embodiment of the invention with three main pole layers.
Figure 5D:
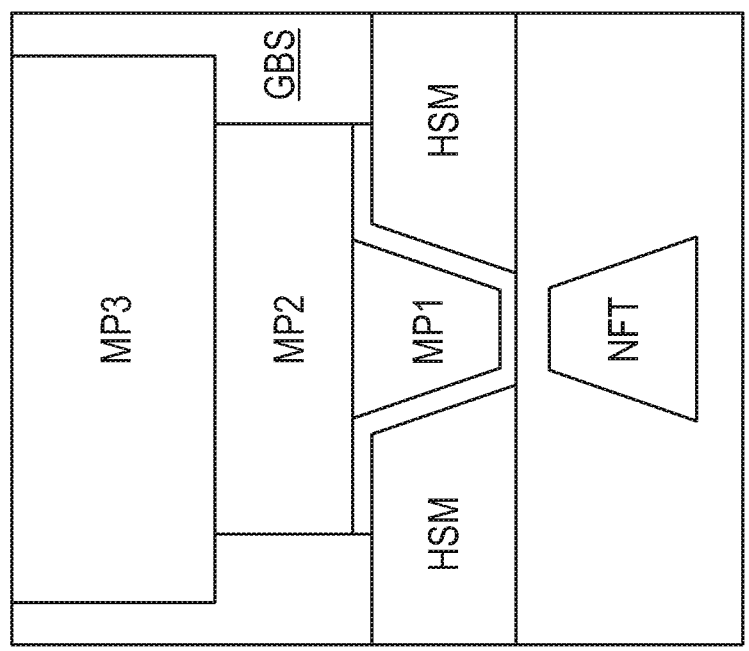
FIG. 5D is a view of a portion of the GBS of the HAMR head according to an embodiment of the invention where both MP1 and MP2 are tapered.

The main pole may be formed of more than two layers. FIG. 5C is a view of a portion of the GBS of the HAMR head according to an embodiment with three main pole layers, wherein MP3 has a wider cross-track width than MP2. MP2 may also be tapered. FIG. 5D is a view of a portion of the GBS of the HAMR head according to an embodiment of the invention where both MP1 and MP2 are tapered, with the tapered end of MP2 in contact with MP1.

Figure 6A:
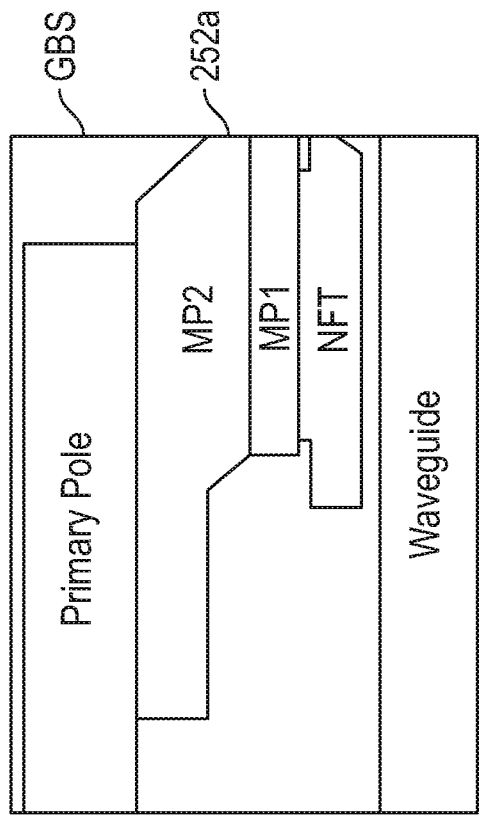
FIG. 6A is a side sectional view of the HAMR head according to an embodiment of the invention and shows the MP2 end fully recessed from the GBS.
Figure 6B:
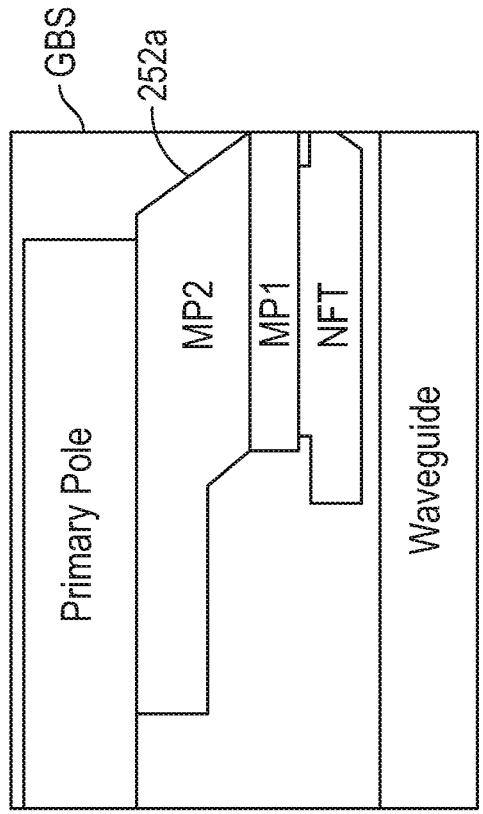
FIG. 6B is a side sectional view of the HAMR head according to an embodiment of the invention and shows the MP2 end with only a portion recessed from the GBS.

MP2 may have its end 252*a* at least partially recessed from the GBS to avoid oxidation of MP2. As shown in FIG. 6A, MP2 end 252*a* is fully recessed from the GBS. Alternatively, as shown in FIG. 6B, only a portion of MP2 end 252*a* may recessed from the GBS, and with a sloped surface at its recessed portion, to increase the magnetic field applied at the GBS.

Figure 7:
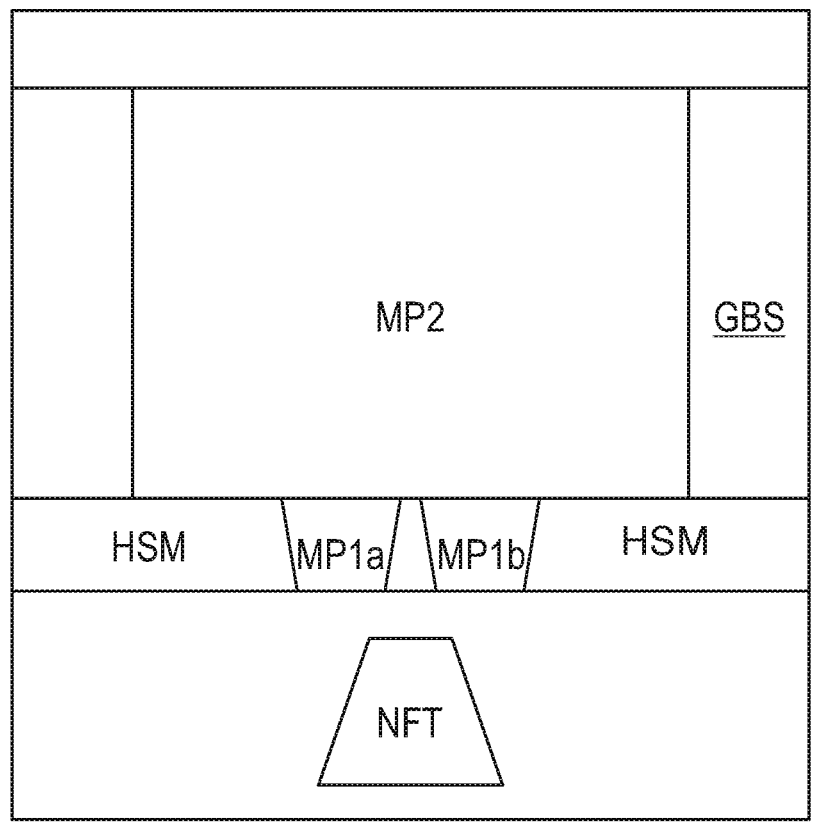
FIG. 7 is a view of a portion of the slider GBS showing an embodiment of the invention wherein the MP1 is formed with two tapered ends.

MP1 may also be formed to have two tapered ends, MP1*a* and MP1*b*, with the NFT being aligned in the along-the-track direction with a portion of each tapered end, as shown in FIG. 7. The center of MP1, the region between the two tapered ends, will have the highest temperature because it is closest to the NFT. Because that region is formed of non-magnetic HSM, there is less likelihood of oxidation of either of the two tapered ends.

Figure 8:
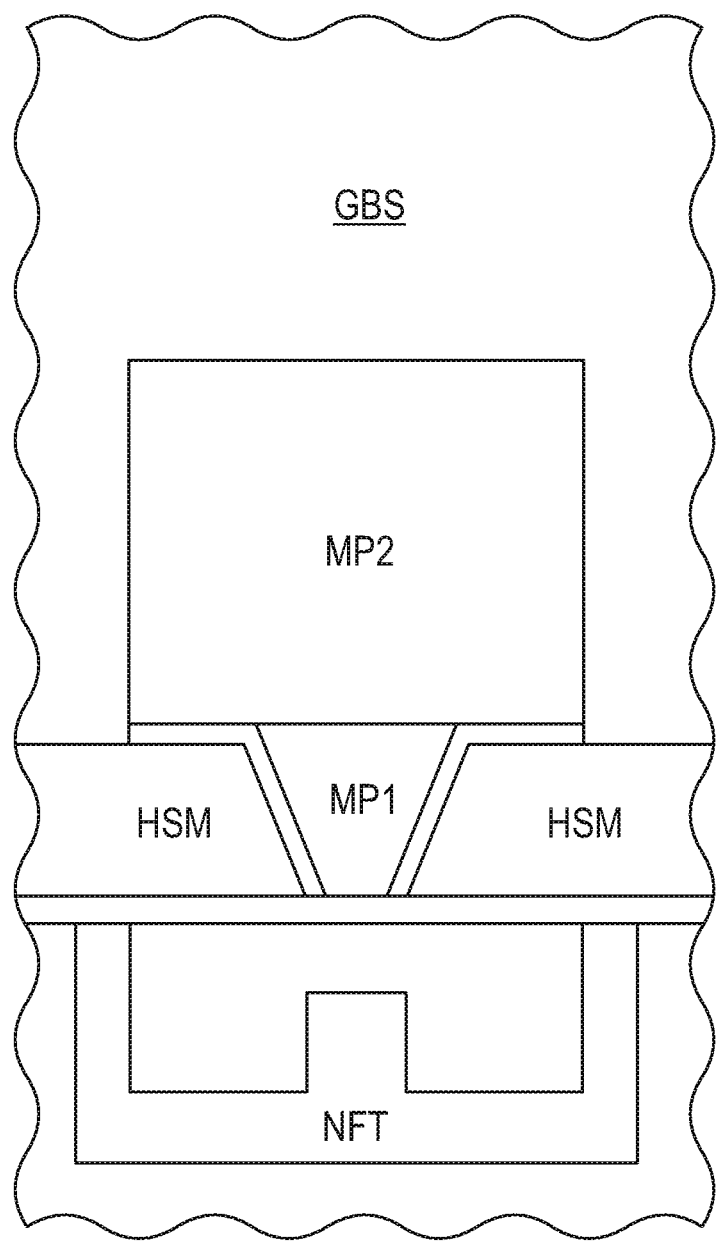
FIG. 8 is a view of a portion of the slider GBS showing an embodiment of the invention wherein the NFT is an E-shaped antenna.

Embodiments of the invention have been shown and described with an NFT having a generally triangular or generally trapezoidal end at the GBS. However, the invention is fully applicable with other types of well-known NFTs, like an E-shaped antenna as shown in FIG. 8.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat assisted magnetic recording (HAMR) head for writing to a magnetic recording layer comprising:
   a head carrier having a recording-layer-facing surface with an along-the-track axis and a cross-track axis substantially orthogonal to the along-the-track axis;
   a main pole on a surface substantially orthogonal to the recording-layer-facing surface, the main pole comprising a first layer and a second layer in contact with the first layer, the first layer tapering in an along-the-track direction from the second layer, the first layer having a trapezoidal shape at the recording-layer-facing surface, wherein a cross-track width at the recording-layer-facing surface of the first layer is less than 50 nm, wherein a cross-track width at the recording-layer-facing surface of a first surface of the second layer is longer than the cross-track width of the first layer, and wherein the second layer has a second surface coupled to the first surface, the second surface being at least partially recessed from the recording-layer-facing surface;
   a near-field transducer (NFT) layer on the head carrier oriented substantially parallel to the first layer, the NFT layer having an output tip at the recording-layer-facing surface aligned with the first layer trapezoidal shape in the along-the-track direction;
   heat sink material adjacent the cross-track sides of the tapered main pole first layer, wherein the heat sink material extends in the along-the-track direction beyond an end of the first layer;
   a diffusion layer, wherein the heat sink material is spaced from the first layer in the cross-track direction at the recording-layer-facing surface by the diffusion layer; and
   a primary pole disposed on a third surface of the second layer of the main pole, the third surface of the main pole being coupled to the second surface, wherein the third surface and the primary pole are recessed from the recording-layer-facing surface.

2. The HAMR head of claim 1 wherein the heat sink material is selected from Au, Cu, Ag, Al, Mg, In, Ir, Rh, Ru, Cr, Be, Mo, Co, W, Ti, Ni, Pt, and alloys of two or more of Au, Cu, Ag, Al, Mg, In, Ir, Rh, Ru, Cr, Be, Mo, Co, W, Ti, Ni, Pt.

3. The HAMR head of claim 1 wherein the heat sink material extends in a cross-track direction wider than a cross-track width of the main pole second layer.

4. The HAMR head of claim 1 wherein the NFT layer output tip has a generally triangular shape.

5. The HAMR head of claim 1 wherein the NFT layer output tip is generally E-shaped.

6. The HAMR head of claim 1 wherein the main pole second layer has a trapezoidal shape at the recording-layer-facing surface tapered in the along-the-track direction with a tapered end in contact with the first layer.

7. The HAMR head of claim 1 wherein the first layer is formed of a first ferromagnetic material having a first magnetic moment and wherein the second layer is formed of a second ferromagnetic material having a second magnetic moment, the first magnetic moment is greater than the second magnetic moment.

8. The HAMR head of claim 1 further comprising a magnetoresistive read head on the head carrier.

9. A heat-assisted recording (HAMR) disk drive comprising:
   the HAMR head of claim 8;
   an optical waveguide coupled to the NFT layer;
   a laser for directing light to the waveguide; and
   a magnetic recording disk having a magnetic recording layer.

10. The HAMR head of claim 1, wherein the cross-track width of the first layer is configured to reduce a rise time of a write current.

11. The HAMR head of claim 1, wherein the heat sink material is spaced from the second layer in the along-the-track direction at the recording-layer-facing surface by the diffusion layer.

12. The HAMR head of claim 1, wherein the cross-track width at the recording-layer-facing surface of the second layer is about 200 nm, and wherein the first and second layers comprise different materials.

13. A heat assisted magnetic recording (HAMR) head for writing to a magnetic recording layer comprising:
   a head carrier having a recording-layer-facing surface with an along-the-track axis and a cross-track axis substantially orthogonal to the along-the-track axis;
   a main pole on a surface substantially orthogonal to the recording-layer-facing surface, the main pole comprising a first layer and a second layer in contact with the first layer, the first layer tapering in an along-the-track direction from the second layer, the first layer having a trapezoidal shape at the recording-layer-facing surface, wherein a cross-track width of the first layer is less than 50 nm, wherein the second layer has a first surface at the recording-layer-facing surface, and wherein the second layer has a second surface coupled to the first surface, the second surface being at least partially recessed from the recording-layer-facing surface;
   a near-field transducer (NFT) layer on the head carrier oriented substantially parallel to the first layer, the NFT layer having an output tip at the recording-layer-facing surface aligned with the first layer trapezoidal shape in the along-the-track direction;
   heat sink material adjacent the cross-track sides of the tapered main pole first layer, wherein the heat sink material is recessed in the along-the-track direction from an end of the first layer; and
   a primary pole disposed on a third surface of the second layer of the main pole, the third surface of the main pole being coupled to the second surface, wherein the third surface and the primary pole are recessed from the recording-layer-facing surface.

14. The HAMR head of claim 13 wherein the heat sink material is selected from Au, Cu, Ag, Al, Mg, In, Ir, Rh, Ru, Cr, Be, Mo, Co, W, Ti, Ni, Pt, and alloys of two or more of Au, Cu, Ag, Al, Mg, In, Ir, Rh, Ru, Cr, Be, Mo, Co, W, Ti, Ni, Pt.

15. The HAMR head of claim 13 wherein the heat sink material extends in the cross-track direction wider than a cross-track width of the main pole second layer.

16. The HAMR head of claim 13 wherein the NFT layer output tip has a generally triangular shape.

17. The HAMR head of claim 13 wherein the NFT layer output tip is generally E-shaped.

18. The HAMR head of claim 13 wherein the main pole second layer has a trapezoidal shape at the recording-layer-facing surface tapered in the along-the-track direction with a tapered end in contact with the first layer.

19. The HAMR head of claim 13 wherein the first layer is formed of a first ferromagnetic material having a first magnetic moment and wherein the second layer is formed of a second ferromagnetic material having a second magnetic moment, the first magnetic moment is greater than the second magnetic moment.

20. The HAMR head of claim 13 further comprising a magnetoresistive read head on the head carrier.

21. A heat-assisted recording (HAMR) disk drive comprising:
   the HAMR head of claim 20;
   an optical waveguide coupled to the NFT layer;
   a laser for directing light to the waveguide; and
   a magnetic recording disk having a magnetic recording layer.

22. The HAMR head of claim 13, wherein the cross-track width of the first layer is configured to reduce a rise time of a write current.

\* \* \* \* \*

UNITED STATES PATENT AND TRADEMARK OFFICE
CERTIFICATE OF CORRECTION

PATENT NO. : 11,462,243 B1
APPLICATION NO. : 16/943995
DATED : October 4, 2022
INVENTOR(S) : Takuya Matsumoto et al.

It is certified that error appears in the above-identified patent and that said Letters Patent is hereby corrected as shown below:

On the Title Page

In item (72), correct the spelling of the Inventor's name from Barry Stripe to Barry Stipe Signed and Sealed this
Thirteenth Day of June, 2023

Katherine Kelly Vidal
*Director of the United States Patent and Trademark Office*